United States Patent [19]

Wertepny

[11] 4,064,633
[45] Dec. 27, 1977

[54] GAUGING INSTRUMENT

[76] Inventor: Alexander W. Wertepny, 2063 Craig Drive, Des Plaines, Ill. 60018

[21] Appl. No.: 665,540

[22] Filed: Mar. 10, 1976

[51] Int. Cl.² .......................... G01B 5/10; G01B 5/25
[52] U.S. Cl. .............................. 33/147 E; 33/174 Q; 33/178 D
[58] Field of Search ............ 33/147 E, 172 R, 172 E, 33/174 L, 174 Q, 174 M, 178 D, 178 E

[56] References Cited

U.S. PATENT DOCUMENTS

| 2,470,404 | 5/1949 | Kloos | 33/174 Q |
| 2,547,719 | 4/1951 | Rosser | 33/174 Q |
| 2,908,084 | 10/1959 | Pristo | 33/174 L |
| 3,795,055 | 3/1974 | Zucco | 33/174 Q |

FOREIGN PATENT DOCUMENTS

| 898,558 | 7/1944 | France | 33/172 R |
| 905,663 | 4/1945 | France | 33/147 E |
| 1,337,854 | 8/1963 | France | 33/174 Q |
| 188,830 | 4/1964 | Sweden | 33/174 L |

Primary Examiner—Richard E. Aegerter
Assistant Examiner—Richard R. Stearns
Attorney, Agent, or Firm—Wegner, Stellman, McCord, Wiles & Wood

[57] ABSTRACT

An improved measuring and gauging instrument is provided for determining concentricity, out of roundness, flatness, diameters, thickness, and the like dimensions, of a workpiece for checking or comparing the accuracy of the workpiece. The instrument includes a stand or frame having a bar upon which is mounted one or more V-blocks, or mounting blocks, with each V-block having a fixedly mounted indicator dial and each mounting block having a floatingly mounted gauge. The fixedly indicator dial is used to check a workpiece for concentricity, out of roundness and diameters. The floating gauge has an anvil for engaging an undersurface of a workpiece with the contact point of the gauge engaging the workpiece at the opposite side thereof whereupon the thickness and out of roundness of the workpiece is checked. The floating gauge may be used on bench-center gauges, indicator stands and the like.

11 Claims, 11 Drawing Figures

GAUGING INSTRUMENT

BACKGROUND OF THE INVENTION

1. Field of the Invention

This invention relates to gauging instruments and, more particularly, to fixed or floating gauging instruments for measuring concentricity, out of roundness, thickness, flatness, and the like.

2. Description of the Prior Art

Currently, there is a wide variety of systems and instruments being used to check a workpiece for concentricity, out of roundness, and the like. These instruments are very expensive and very complex.

SUMMARY OF THE INVENTION

A frame is provided with a mounting bar extending substantially from one end thereof to the other. One, and preferably two, V-blocks are mounted on the bar and have locking members for fixing the V-blocks relative to the bar at desired locations therealong. A fixed indicator dial is carried by each V-block with a contact point projecting along an axis perpendicular to one side wall of the V-block so that a workpiece positioned in the V-block can be gauged for diameter, out of roundness and/or concentricity.

In one form of the invention, a mounting block is secured to a selected location along the bar with a floating gauge resiliently connected to the mounting block, such that an anvil portion of the gauge engages one side of a workpiece with the contact point of the gauge engaging the workpiece diametrically opposite the anvil for recording on the indicator dial of the gauge a diameter and out of roundness of the workpiece. The action of the floating gauge may be disengaged so that the floating gauge becomes a fixed gauge whereupon, when properly positioned, it can serve to measure out of roundness and concentricity.

The floating gauge may be mounted on a bench-center instrument for checking diameters and, when the action of the gauge is locked, it can be used for checking concentricity. The floating gauge also may be used with V-blocks, indicator stands and other forms of measuring instruments to accomplish a wide variety of measurements.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 6:
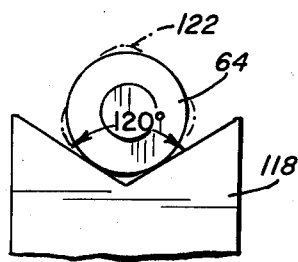
FIGS. 6 and 6A show different angled V-blocks.
Figure 6A:
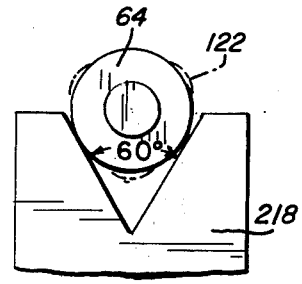

Referring to the drawings, numeral 10 illustrates my improved measuring and gauging instrument and includes a mounting bar 12, which is supported in spaced relationship from a surface by means of the legs 14. It should be noted that a three-point or three-legged support is provided so as to reduce wobble and instability of the stand on an uneven surface. A length measuring gauge 16 is adjustably mounted on the left-hand portion of the bar of FIG. 1 for measuring or gauging the length of all or of a part of a workpiece and operates in the manner shown and described in U.S. Pat. No. 3,235,968, issued Feb. 22, 1966 in the name of Stanley A. Wertepny. Axially spaced from each other along the mounting bar 12 is a pair of V-blocks 18 and 20, which are adapted to be locked in position along the length of the bar 12 by means of thumbscrews 22 or the like. The V-blocks 18 and 20 have the angle of the V-opening 24 of a particular size and, as best shown in FIGS. 6 and 6A, the angle of the opening can be 120° (FIG. 6), 60° (FIG. 6A) or 90° (not shown).

Figure 2:
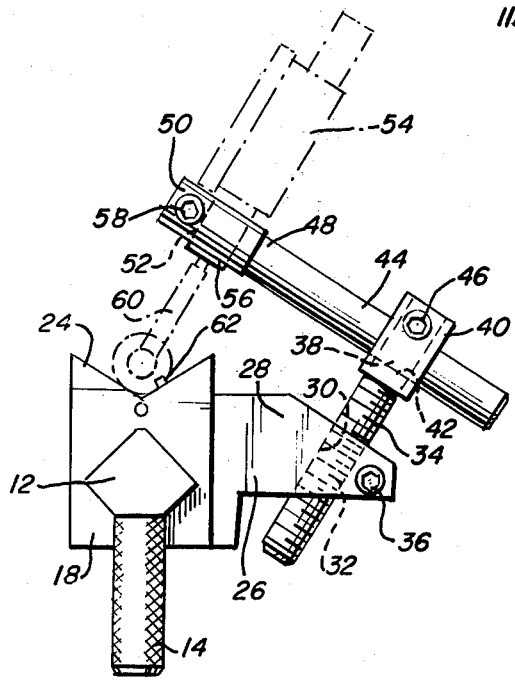
FIG. 2 is a view taken along the lines 2—2 of FIG. 1.

For the present purposes, the V-block 18 and the associated gauging function is the same as V-block 20 and, accordingly, only the structure of block 18 will be described in detail. Referring to FIG. 2, the V-block 18 has a support member 26 rigidly fastened on one side thereof with a vertically split outer portion 28. An opening 30 bridges the split and is threaded at 32 to receive a threaded stub shaft 34 therethrough. The axis of the opening 30 and the axis of the stub shaft 34 is at an angle to the vertical plane of the axis of the mounting bar 12. An Allen head set screw 36 joins the two halves of the split portion 28 and, when tightened, locks the stub shaft 34 against movement. The remote end portion 38 of the stub shaft 34 has a split element 40 rigidly secured thereto with an opening 42 extending transverse to the axis of the shaft 34. A rod 44 fits in the opening 42 and is locked in position thereby by means of the Allen head set screw 46. The outer end portion 48 of the rod 44 has a split segment 50 with an opening 52 bridging the split and said opening having an axis transverse to the axis of the rod 44. A dial indicator 54, of commercially available construction, such as sold by Mitutoyo of Japan, has a mounting sleeve 56 secured in the opening 52 in the segment 50 and is locked in position therein by the Allen head set screw 58. The contact point 60 of the dial indicator 54 projects through the sleeve 56 and in the direction of one wall of the V-block 18. The axis of the sleeve 56 is perpendicular to one wall of the V-block.

Figure 1:
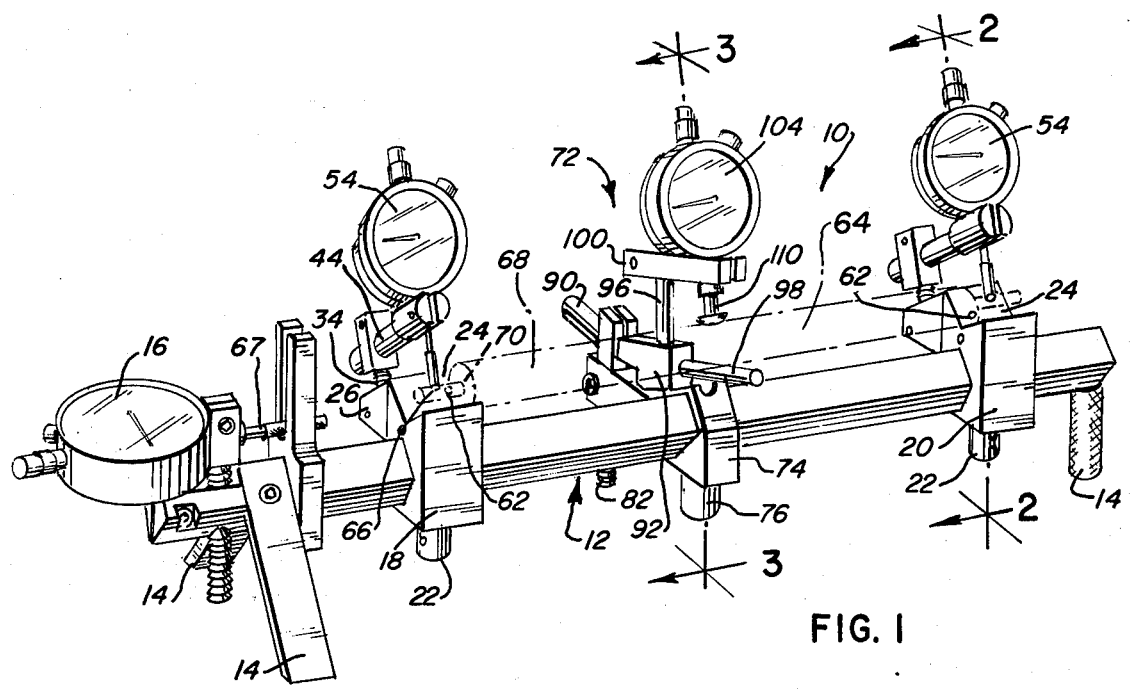
FIG. 1 illustrates a gauging instrument having both fixed and floating gauge arrangements according to my invention.

In one form of the invention, a stop or lug 62 is set in the face of the V-opening of each V-block 18 and 20 on the side of the V-block nearest the midportion of the mounting bar 12. The V-blocks 18 and 20 are initially adjusted relative to each other until the distance between the stops 62 is a precise predetermined amount. In practice, a workpiece 64, such as shown in FIG. 1, is manufactured with concentric spindles or axles 66 on each end. The diameters of the spindles 66 and main body 68 are required to be within very narrow tolerances and the concentricity of the spindles 66 with respect to the main body likewise must be within close tolerances. In addition, the length of the main body 68 and the lengths of the spindles 66 must be within close tolerances, all of which dimensions can be gauged or checked with the present instrument. With the stops 62 set to the required dimension, a workpiece 64 is dropped into position with the shoulders 70 on the body 68 abutting the stops 62. If the body 68 is too long, it will not nest between the stops 62 and the piece will be rejected. With the piece urged to the left against stop 62 on block 18, the probe 67 of the gauge 16 engages the end of the spindle 66 to measure the length thereof. The piece 64 is turned end for end and the length of the other spindle is checked the same way.

The contact point 60 on the indicator 54 engages the spindles 66 and rotation of the piece 64, while watching the needle on the dial indicator, will give an indication whether or not the spindle is concentric with the periphery of the body 68 of the piece. The diameters of the spindles 66 can be measured by engaging the contact point with the spindle when the spindle is engaging with the "V" of the V-block and the diameter of the body 68 can be measured by engaging the contact point with the body 68 when the body is seated in the "V" of the V-block. With the stops 62 removed and the body 68 extending beyond the V-block, the spindle 66 extends further beyond the end of the V-block. To measure the concentricity, the indicator 54 is adjusted by loosening the set screws 36 and 46. The shaft 34 is rotated so that the rod 44 angles in the direction of and points toward the overhanging spindle 66. The rod 44 is now moved outwardly with respect to the shaft 34 until the contact point 60 on the dial indictor is aligned with the overhanging spindle 66. The set screws 36, 46 are retightened and the indicator 54 is calibrated so that it is, once again, possible to check the concentricity of the spindle 66 with respect to the body 68 of the piece 64.

For checking diameters of the body 68 of the piece 64 and, under certain circumstances, to check concentricity of the central portion of the piece 64 with respect to the end portions, a floating gauge 72 is provided. Although for purposes of illustration I have shown the floating gauge 72 between the V-blocks 18 and 20, it is to be understood that the floating gauge can be used with any supports, such as V-blocks 18 and 20, and can be mounted on either end portion of the mounting bar 12, inboard or outboard of the supports or V-blocks 18 and 20.

Figure 3:
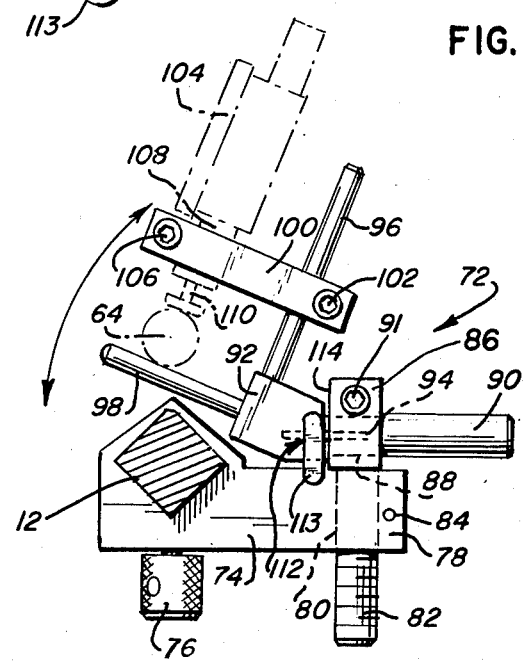
FIG. 3 is a view taken along the lines 3—3 of FIG. 1.

As shown in FIG. 3, the floating gauge 72 has a mounting block 74, which is adopted to be movably mounted on the mounting bar 12, and may be locked in position on said bar 12 by tightening the thumbscrew 76. The remote end portion 78 of the block 74 is split and has a threaded opening 80 vertically extending therethrough. A stub shaft 82 is threaded in said opening 80 and is adapted to be locked in a predetermined position by tightening an Allen head screw 84 passing through the two split halves of the block. A split element 86 is fastened to the end portion of the shaft 82 and has an opening 88 bridging the split halves of the element with the axis of the opening lying perpendicular to the axis of the shaft 82. A rod 90 passes through the opening 88 and is locked in position by means of set screw 91 in the split halves of the element 86. As can be seen more clearly in FIGS. 4 and 4A, a support member 92 is pivotally and resiliently connected to the rod 90 by means of a leaf spring 94 which is secured to the support member 92 and to the rod 90 so as to form a resilient hinge between the two.

A pin 96 is anchored in the support member 92 and extends upwardly therefrom while an anvil or reference element 98 is anchored in and extends outwardly from said member 92. The longitudinal axis of the anvil 98 is perpendicular to the longitudinal axis of the pin 96. A clamp bar 100 is secured to the pin 96 by means of the Allen head set screw 102 clamping the split ends of the bar to the pin while a dial indicator 104 is secured to the other end of the bar 100 by means of the Allen head set screw 106 clamping the sleeve 108 of the dial indicator between the split ends of said bar 100. A contact point 110 of the dial indicator 104 extends through the sleeve 108 and points in the direction of the horizontal plane containing the axis of the anvil 98.

The dial indicator 104 and its support is a floating gauge resiliently, pivotally or hingedly connected to the fixed mount on the mounting bar and, in use on an instrument of FIG. 1, will have the anvil 98 urged by the spring 94 against the bottom edge of the piece 64 whereupon the contact point 110 will contact the top edge of the piece which will result in a measurement of the diameter of the piece 64. As is illustrated in part in FIG. 5, the piece 64 is shown in an extremely distorted condition and still the floating gauge is able to contact and measure the diameter of the body 68 of the piece as long as the range of the spring float is not exceeded.

Figures 4, 4A:
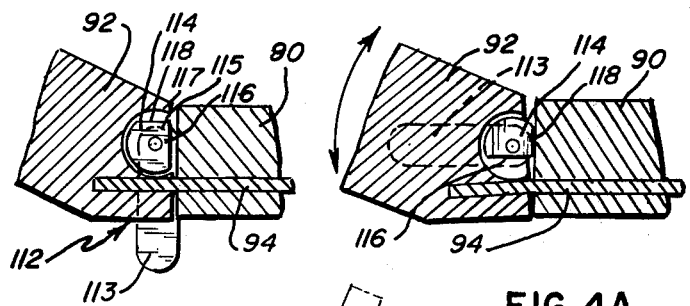
FIGS. 4 and 4A are enlarged sectional views of the mechanism for locking the floating gauge.

As shown in FIGS. 3, 4 and 4A, a latch 112 has a handle 113 connected to a rotatable shaft 114 which extends into the support member 92. The shaft 114 has a shaped portion 115 with one face 116 which substantially aligns with the one wall 117 of the member 92 when the handle 113 is pointing down as in FIGS. 3 and 4. A second face or land 118 on the shaft 114 is spaced radially outward from the axis of the shaft a greater distance such that when the handle 113 is rotated 90°, as in FIG. 4A, the land or face 118 will engage the facing wall of the rod 90 and urge the floating gauge counterclockwise to a locked or fixed position with the anvil 98 moved downward out of contact with a workpiece whereupon the gauge can be used to measure concentricity, out of roundness, and the like. With the floating gauge 72 floating, a workpiece supported on a pair of blocks can be checked for diameters and the like. With the floating gauge 72 locked up, as in FIG. 4A, with the anvil out of contact with the workpiece, the gauge becomes a fixed gauge and can be used for checking concentricity, out of roundness, and the like.

Figure 5:
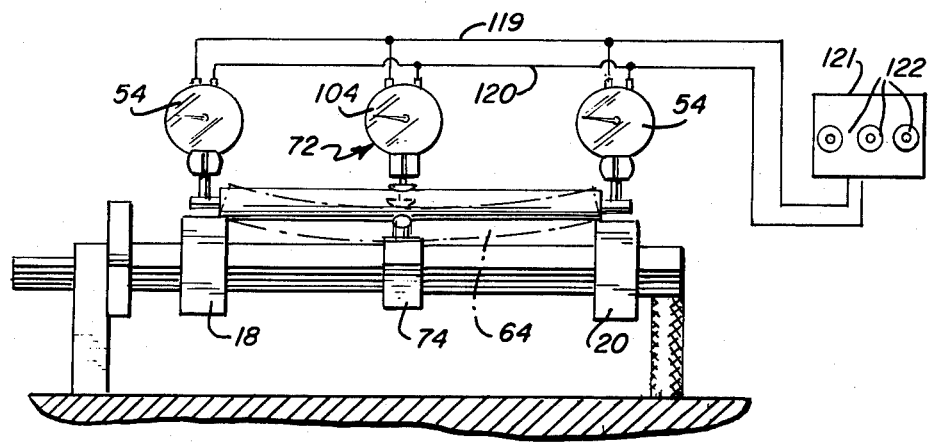
FIG. 5 is a somewhat schematic view, similar to FIG. 1, showing a modified form of my invention.

As shown in FIG. 5, a gauging instrument, similar to that illustrated in FIG. 1, is provided and has a pair of V-blocks 18 and 20 with an intermediate floating gauge 72 therebetween. Each dial indicator 54, 104 and 54, has a visual indicator on the dial and is connected electrically in series through the lines 119 and 120 to a control box 121 which has a plurality of lights 122. In this type of system, the indicator lights would indicate, by color of the light illuminated, whether the parts are over, under or in the range of the tolerance limits.

With V-blocks, as shown in FIGS. 6 and 6A, having an included angle of 120° or 60°, the problems of lobbing are minimized during gauging of the workpiece.

Figure 7:
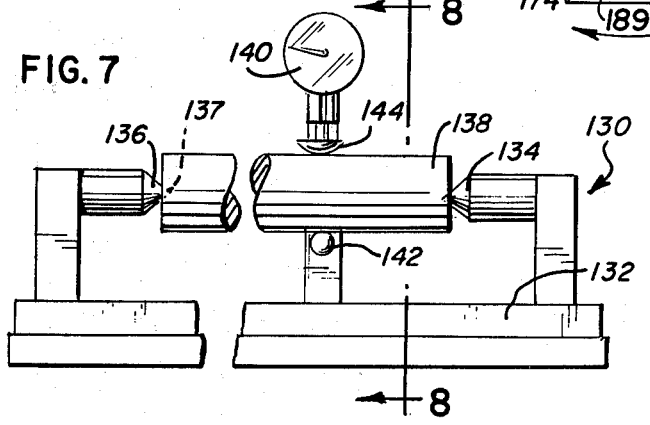
FIG. 7 shows my floating gauge mounted on a bench-center instrument.
Figure 8:
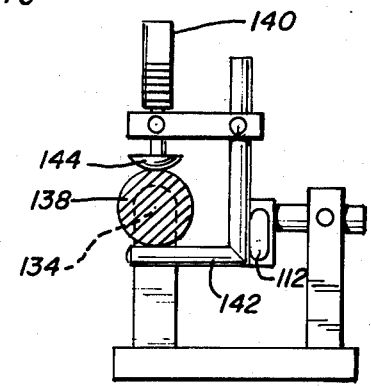
FIG. 8 is a view taken along the lines 8—8 of FIG. 7.

FIGS. 7 and 8 illustrate a bench-center instrument 130 wherein a mounting bar 132 is formed with a pair of male centers 134, 136 which are adapted to be engaged in the female centers 137 on the opposite ends of a workpiece 138. A floating gauge 140, such as illustrated in FIG. 3, is mounted on the bench-center instrument 130 and can be moved axially along the mounting bar 132. At each location where a measurement is to be taken, the gauge 140 is locked in position on the bar 132 and, with the anvil 42 engaging the underside of the workpiece, the dial indicator will give the measurement. The floating gauge 140, in its floating mode, is used for measuring diameters of the workpiece 138. With a cam and lever locking arrangement, such as shown at 112 in FIGS. 3, 4 and 4A, the floating gauge 140 becomes a rigid gauge with the anvil 142 out of engagement with the workpiece. The contact point 144 of the dial indicator now engages the one side of the workpiece and as the workpiece is rotated, the concentricity or out of roundness of the workpiece, with respect to the female centers 137, is checked. Therefore, with the floating gauge 140 floating, the diameter of the workpiece is measured and with the floating gauge locked so that the anvil 142 is out of contact with the workpiece, the gauge serves to check for concentricity, out of roundness, and the like.

Figure 9:
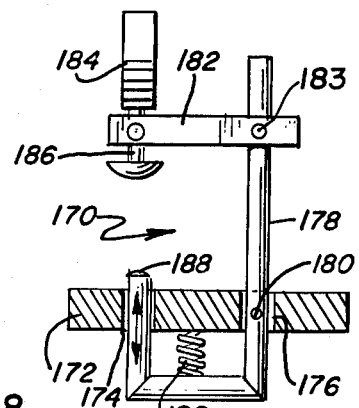
FIG. 9 shows my floating gauge being used on an indicator stand.

FIG. 9 illustrates still another modified version of my invention wherein an indicator stand 170 has been modified to use my floating gauge principle. That is, the indicator stand base 172 has two openings 174, 176 formed therein. The one opening 176 permits a vertical column 178 to pass therethrough and to be pivotally pinned at 180 therein. Mounted on the vertical column 178 is a support bar 182 for positioning a dial indicator 184 in position so that a probe 186 projects downwardly toward the base 172 of the indicator stand. The support bar 182 is adjustable relative to the vertical column of mounting block 178 by means of the locking screw 183. Loosening the screw 183 releases the support bar 182 for vertical adjustment. Connected to the lower portion of the vertical column is an anvil 188 which projects upwardly through the opening 174 in the base and is adapted to engage the lower surface of a workpiece being gauged. With the gauge acting as a floating gauge, i.e., the column pivotable about the pin 180, the spring 189 urges the anvil 188 into contact with the workpiece so that the thickness of the piece or the diameter of a rod is measured. Upon locking the column 178 to the base by any suitable means with the anvil 188 out of position for engagement with the lower surface of a workpiece, the instrument becomes a flatness gauge.

In FIG. 3, I have shown and described the floating gauge 72 as being resiliently mounted by means of a leaf spring 94. It is contemplated that other forms of resilient mounts may be employed, such as a ball and socket arrangement between the support member 92 and the rod 90 with a coil spring between the support member 92 and the mounting block 74, so as to urge the support member and the floating gauge in a clockwise direction whereby the anvil 98 is urged upwardly against the lower surface of a workpiece. Other forms of floating concepts are contemplated whereby the anvil 98 is urged upwardly against the workpiece as the probe bears down on the top surface of said piece.

Although I have illustrated my invention as using a dial indicator for indicating diameters, out of roundness, or changes in concentricity of the various parts of a workpiece being gauged, it should be understood that the gauge may be replaced with a light boxed comparator, an electronic amplifier, or any other known gauging instrument just so long as the instrument produces a measurement from a reading on a workpiece. One of the principal concepts which has evolved from my invention, is the concept of a floating gauge which, when floating, can be used for checking diameters, and the like, and when the floating gauge is fixed with the anvil out of contact with the workpiece, the gauge can be used to check concentricities, and the like.

I claim:
1. In a gauging instrument
a mounting bar,
means for supporting said mounting bar in a spaced relation with respect to a surface,
a pair of V-blocks carried by said mounting bar and being longitudinally movable along said mounting bar,
means for locking said V-blocks relative to said mounting bar,
a support means carried by each V-block, and
a dial indicator means carried by each said support means and having a probe extending toward one surface of the "V" of the V-block whereby a workpiece positioned on said V-blocks is engaged by one of said probes for gauging the roundness and measuring the diameters of said workpiece.

2. In a gauging instrument as claimed in claim 1 wherein a stop is provided in the "V" of each block such that the distance between the stops can be accurately set.

3. In a gauging instrument as claimed in claim 1 wherein the included angle of the "V" of the V-blocks is 60°.

4. In a gauging instrument as claimed in claim 1 wherein the included angle of the "V" of the V-blocks is 120°.

5. In a gauging instrument as claimed in claim 1 wherein each of said support means comprises an extension mounted on the side of said block, a stub shaft threaded into said extension, a rod connected in one end of said stub shaft and projecting at an angle to said shaft, and a gripping member carried at the outer end of said rod engaging and holding said dial indicator means.

6. In a gauging instrument as claimed in claim 5 wherein set screws are provided for locking the stub shaft relative to the extension member and for locking the rod relative to the stub shaft and for locking the dial indicator means relative to the rod.

7. In a gauging instrument
a mounting bar,
means for supporting said mounting bar in a spaced relation with respect to a surface,
a pair of V-blocks carried by said mounting bar and being longitudinally movable along said mounting bar,
means for locking said V-blocks relative to said mounting bar,
a mounting block carried by said mounting bar and being longitudinally movable relative to said mounting bar,
means for locking said mounting block relative to said mounting bar,
a stub shaft threaded into said mounting block,
a rod connected in one end portion of said stub shaft,
a base member resiliently carried by said rod,
an anvil projecting outwardly from said base member and being generally aligned with said V-blocks,
a second rod projecting upwardly from said base member at substantially a right angle with respect to said anvil,
an elongated gripping member carried by said second rod and having its longitudinal axis lying in a plane substantially parallel to said anvil, and
a dial indictor means carried by said gripping member with a probe extending toward the anvil whereby a workpiece positioned on said V-blocks is engaged by said anvil and by said probe whereby the diameter of said workpiece is measured.

8. In a gauging instrument as claimed in claim 7 wherein means are provided for locking said base member relative to said rod.

9. In a gauging instrument as claimed in claim 8 wherein dial indicator means are carried by each of said V-blocks with a probe extending toward one wall of the "V" for engagement with the workpiece positioned on said V-blocks.

10. In a gauging instrument
a mounting bar,
means for supporting said mounting bar in a spaced relation with respect to a surface,
a mounting block carried by said mounting bar and being movable along said mounting bar,
means for locking said mounting block relative to said mounting bar,
a shaft carried by said mounting block,
a rod connected to one end portion of said shaft,
a base member resiliently carried by said rod,
an anvil projecting outwardly from said base member,
a second rod projecting upwardly from said base member at substantially a right angle with respect to said anvil, and
a dial indicator means carried by said second rod with a probe extending toward said anvil whereby a workpiece is engaged between the anvil and the probe for measuring the diameter of said workpiece.

11. In a surface stand having a base,
a column mounted for limited pivotal movement and extending generally vertically relative to said base,
a mounting block carried by said column and being movable vertically along said column,
means for locking said mounting block relative to said column,
a dial indicator means carried by said mounting block with a probe extending therefrom, and
an anvil carried by the column and extending up through an opening in said base, said anvil engaging one side of a workpiece with said probe engaging the opposite side of said workpiece whereby said workpiece is gauged.

* * * * *

UNITED STATES PATENT AND TRADEMARK OFFICE
CERTIFICATE OF CORRECTION

PATENT NO. : 4,064,633

DATED : December 27, 1977

INVENTOR(S) : Alexander W. Wertepny

It is certified that error appears in the above-identified patent and that said Letters Patent are hereby corrected as shown below:

Column 2, line 42, "thereby" should be --therein--.

Column 4, line 53, after "by" insert --the--.

Signed and Sealed this

Fourth Day of April 1978

[SEAL]

Attest:

RUTH C. MASON
Attesting Officer

LUTRELLE F. PARKER
Acting Commissioner of Patents and Trademarks